Oct. 18, 1955
H. PICK
2,720,873
INTERNAL COMBUSTION ENGINE VALVE ASSEMBLY
Filed Jan. 10, 1952
4 Sheets-Sheet 1
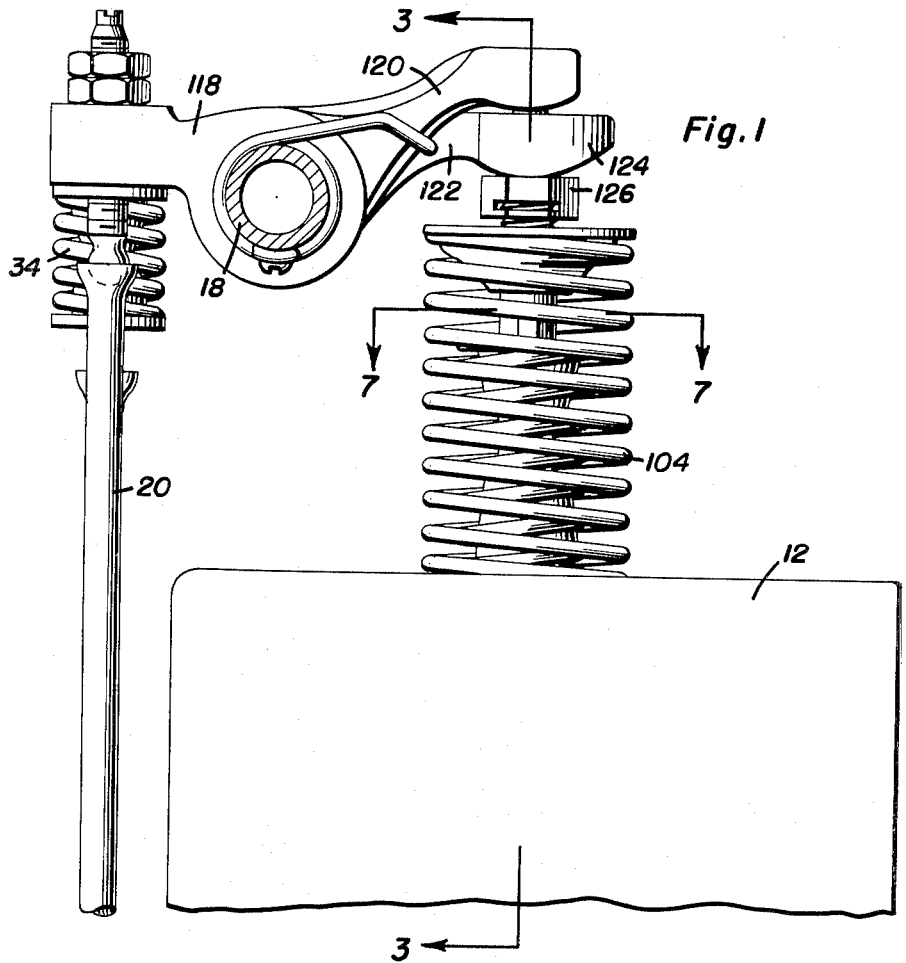
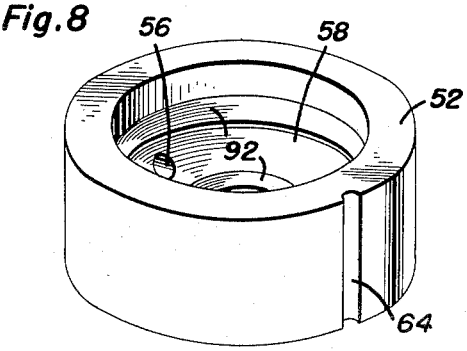
Hans Pick
*INVENTOR.*

Oct. 18, 1955            H. PICK            2,720,873
INTERNAL COMBUSTION ENGINE VALVE ASSEMBLY
Filed Jan. 10, 1952            4 Sheets-Sheet 2
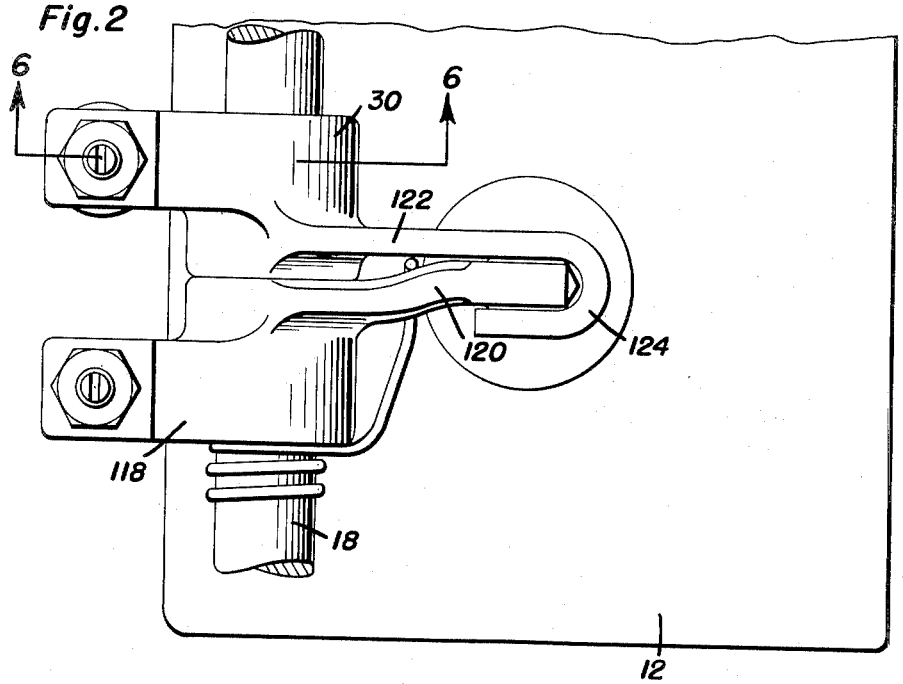
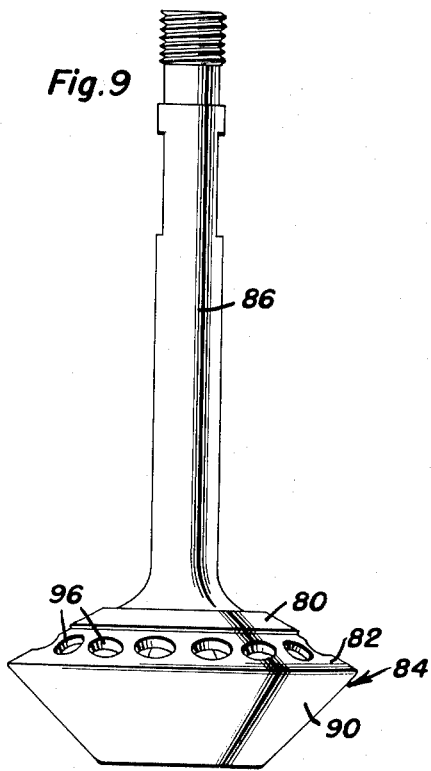
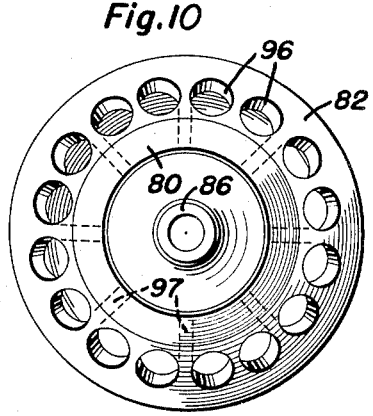
Hans Pick
INVENTOR.

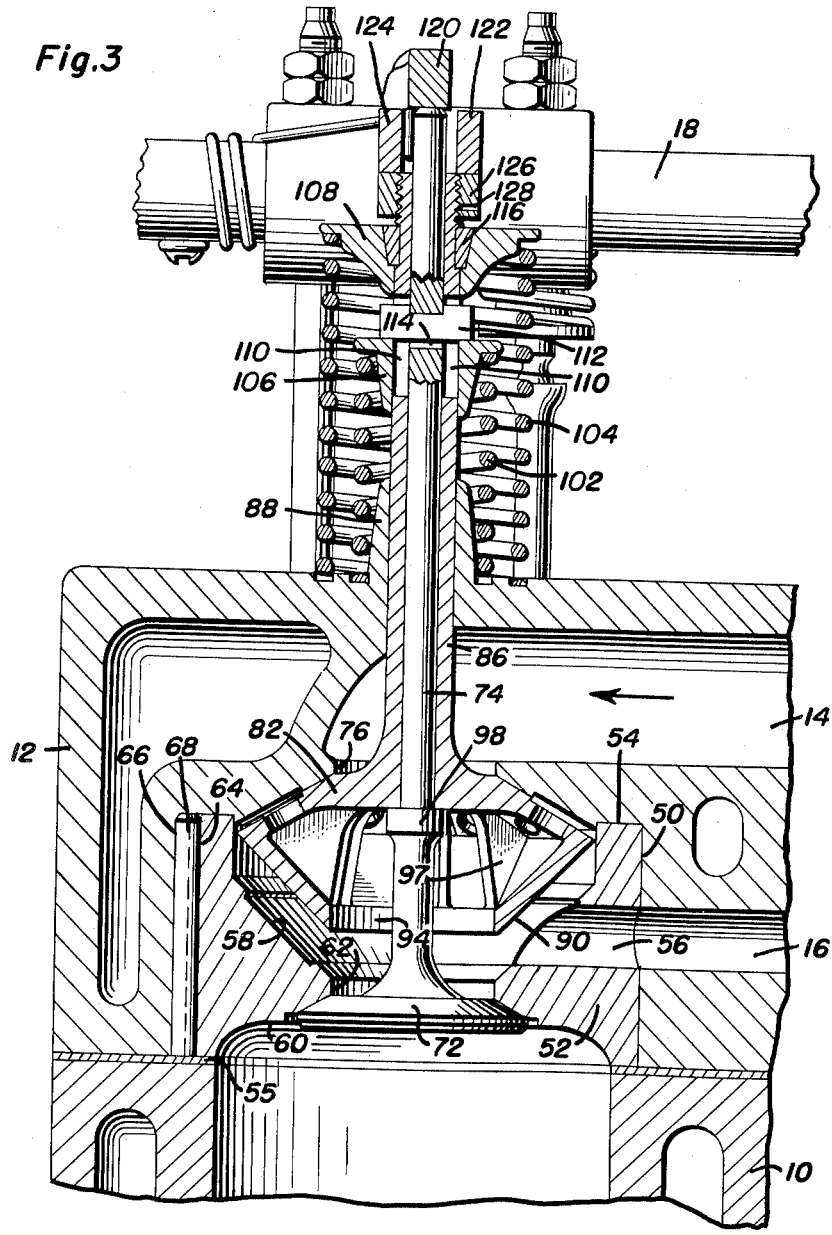
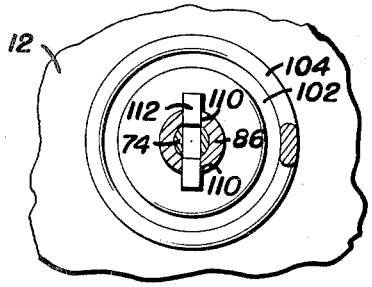

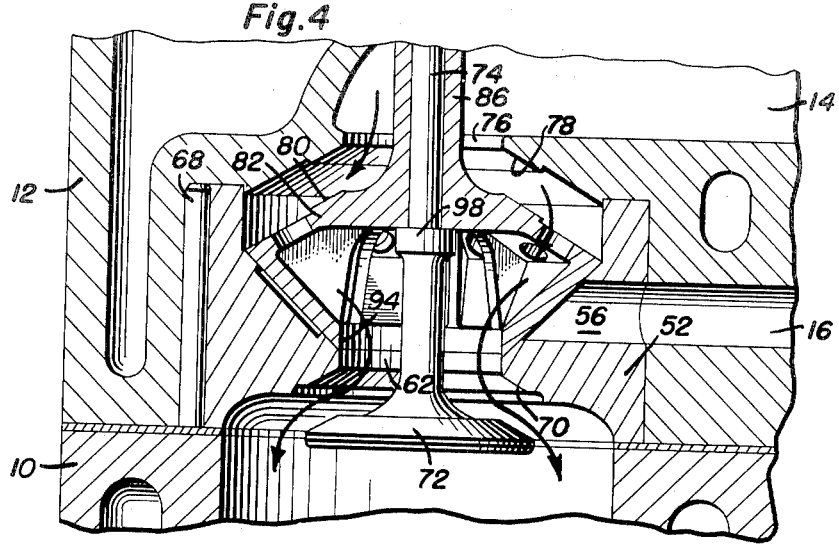
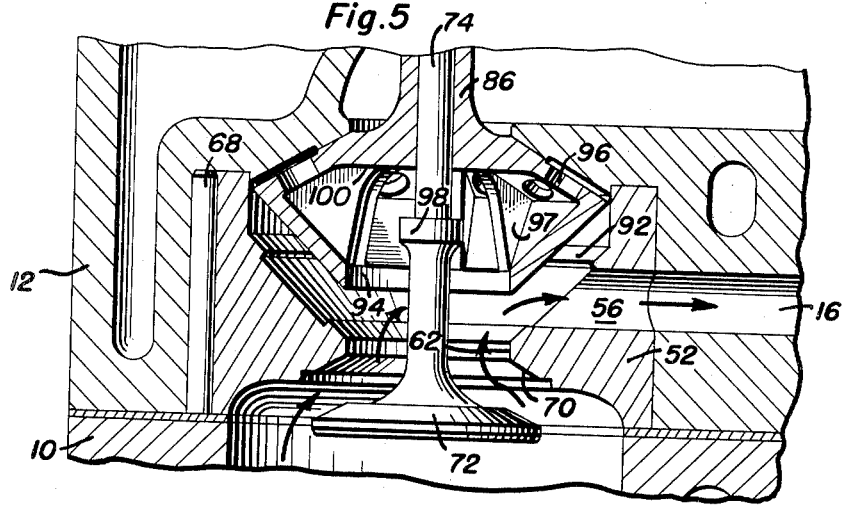
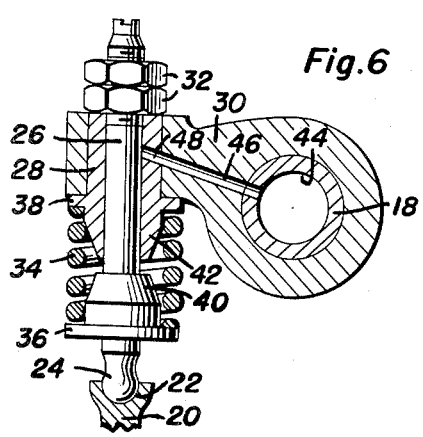
Hans Pick
INVENTOR.

ated Oct. 18, 1955

2,720,873

INTERNAL COMBUSTION ENGINE VALVE ASSEMBLY

Hans Pick, La Paz, Bolivia

Application January 10, 1952, Serial No. 265,771

14 Claims. (Cl. 123—79)

This invention comprises novel and useful improvements in an internal combustion engine valve assembly and more specifically pertains to an improved concentric intake and exhaust valve assembly for the overhead valves of internal combustion engines, and of an improved actuating mechanism therefor.

The primary object of this invention is to provide an improved intake and exhaust valve assembly for internal combustion engines, an improved concentric arrangement of the same, together with improved actuating means for the assemblies.

A further object of the invention is to provide a valve assembly and arrangement whereby the exhaust valve will be cooled by the incoming fresh combustion gases during the intake cycle of the valve assemblies.

A further object of the invention is to provide improved concentric valve assembly for the intake and exhaust valves of internal combustion engines which shall be so arranged as to maintain a more uniform heat balance of the intake and exhaust valves during their operation, thereby reducing the thermal expansion of the moving parts of the valve mechanism with a resultant improvement in the life and efficiency of the engine valve systems.

A still further object of the invention is to provide a valve assembly wherein an increased bearing area is provided between the valve actuating rocker arms and the valve stems.

Yet another object is to provide a valve assembly which shall be extremely compact thereby permitting the use of a smaller compression head and a higher compression ratio as a result of the lower operating temperature of the exhaust valve, the relatively large areas of valve openings, and the relatively small clearance required for the opening of the valves.

Yet another object of the invention is to provide a concentric valve assembly wherein the intake valve deflects the incoming charge against the exhaust valve stem and head to facilitate the cooling of the same.

Yet another and very important object of the invention is to provide a valve assembly which will permit the use of exhaust and intake valves whose area of valve port is greater than is possible with the conventional arrangement whereby the two valves are seated in side-by-side relation in the cylinder head.

A still further important object of the invention is to provide a concentric valve assembly wherein one valve stem is guided within the other valve stem to thereby reduce the number of guide bushings required for the engine head.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view showing a portion of the cylinder head of an internal combustion engine with the valve assembly of this invention applied thereto;

Figure 2 is a fragmentary top plan view of the valve assembly of Figure 1;

Figure 3 is a vertical sectional view, taken substantially upon the plane indicated by the section line 3—3 of Figure 1 and showing the valve assembly of this invention and the manner in which the same is applied to the cylinder head of an internal combustion engine, the combined intake and exhaust valve being illustrated in intake closed and exhaust open position, with the main valve closed;

Figure 4 is a view similar to Figure 3 and showing a portion of the structure of the same, this view indicating the combined valve in intake opened and exhaust closing position and the main valve being opened;

Figure 5 is a view similar to Figure 4 but showing the combined valve in intake closed and exhaust opening position and the main valve being open;

Figure 6 is a fragmentary vertical sectional detail view taken substantially upon the plane indicated by the section line 6—6 of Figure 2 and showing a feature of the invention and a lubricating means therefor;

Figure 7 is a horizontal sectional view taken substantially upon the plane indicated by the section line 7—7 of Figure 1 and showing a valve spring retaining means forming a part of the invention;

Figure 8 is a perspective detail view of a valve seat member forming a part of the invention;

Figure 9 is a perspective view of a combined intake and exhaust valve in accordance with this invention; and Figure 10 is a top plan view of the valve of Figure 9.

Referring now more specifically to the accompanying drawings, wherein like numerals designate similar parts throughout the various views, it will be seen that the improved assembly in accordance with this invention is adapted for use with an overhead valve engine, a portion of the conventional water-jacketed engine block being indicated by the numeral 10, while the water-jacketed removable cylinder head member is indicated by the numeral 12. The cylinder head is provided with customary intake and exhaust passages indicated, respectively, by the numerals 14 and 16, and which may be connected in any desired manner with the customary charge forming device such as the carburetor and intake manifold system, and with the exhaust manifold system respectively.

In the usual overhead valve assembly for internal combustion engines, the valve actuating rockers or levers are customarily journaled upon a rocker shaft 18 which extends longitudinally of and above the cylinder head 12, these valve actuating rockers being ocillated in synchronized relation with the rest of the internal combustion engine by a cam shaft, not shown, which periodically vertically reciprocates the push rod 20, one end of which is adjustably connected to each of the rocker arms of the valve assembly. Referring to Figure 6, it will be seen that the upper end of each push rod 20 is provided with a spherical recess or socket 22 adapted to receive the spherical or ball end 24 which is disposed at the lower end of the pin 26. The latter is slidably received in a bushing 28 disposed in an end of the rocker arm indicated generally by the numeral 30, and which may actuate either an intake or exhaust valve as desired. As illustrated in Figure 6, however, the rocker arm 30 is utilized to operate the intake valve as set forth hereinafter.

The pin 26 is freely slidable in the bushing 28, being limited as to its downward movement by a pair of locking nuts 32 screw threadedly engaged upon the upper end of the pin, while a compression spring 34 surrounds the pin and engages a flange 36 upon the lower portion of the pin and a flange 38 upon the bushing 28 to yieldingly urge the pin downwardly into contact with the push rod 20. It will be noted that reversely disposed conical portions 40 and 42 respectively are formed upon the valve pin adjacent the flange 36 and upon the bushing 28 to constitute guides for positioning the compression spring 34.

The spring and pin arrangement above described permits the necessary amount of lost motion in the valve operating mechanism, it being noted that the adjacent ends of the conical members 40 and 42 will abut each other on the upward stroke of the push rod to thereby deliver the thrust of the valve cam to the valve rocker arm. Lubrication of the pin 26 in its sliding engagement in the bushing 28 is obtained through the usual lubricant passage 44 within the rocker shaft 18, and a passage 46 extending through the rocker arm and into a registering passage 48 in the bushing 28 communicating with the bore in which is slidably received the pin 26.

Referring now more specifically to Figure 3, it will be seen that the cylinder head 12 is provided with a cylindrical chamber 50 therein in which is removably seated a valve seat member 52. This member, as shown in Figure 8 may consist of a cylindrical sleeve-like member having parallel annular top and bottom surfaces which respectively abut the shouldered top wall 54 of the recess 50, and the conventional cylinder head gasket 55 disposed upon the top of the cylinder block 10 and beneath the cylinder head 12. Extending preferably diametrically through one wall of the valve seat member 52 is an exhaust passage 56 adapted to register with the passage 16 in the cylinder head, and intersecting the upward conical surface 58 formed in the upper end of the valve seating member 52. A combustion chamber surface 60 is formed in the lower portion thereof, and these surfaces communicate with each other by an axially disposed passage 62.

The valve seating member 52 is retained in properly rotationally adjusted position in the recess 50 of the cylinder head 12 by the provision of one or more axially extending semi-cylindrical grooves 64 formed in the exterior cylindrical surface of the valve seating member 52, and which register with complementary semi-cylindrical grooves 66 formed in the wall of the recess 50, and a dowel pin 68 is seated in these complementary grooves for retaining the valve seating member 52 and the cylinder head in rotationally adjusted position to insure complete registry of the passages 16 and 56.

The combustion chamber surface 60 immediately adjacent to the passage 62 is provided with a conical surface 70, see in particular Figures 4 and 5, which constitutes a seat for a main valve 72 of the poppet type provided with a valve stem 74. The valve 72 directly controls communication by the passage 62 between the intake and exhaust ports and the interior of the combustion chamber of the cylinder of the internal combustion engine with which the valve assembly is associated.

The intake passage communicates with the chamber in the upper portion of the valve seating member 52 by means of an opening 76 constituting an intake port. Immediately adjacent this port, as best shown in Figure 4, is a conical surface 78 constituting an intake valve seat. This intake valve seat is adapted to be engaged and controlled by a conical valve seating surface 80 carried by the upper part of the upper conical portion 82 of the combined intake and exhaust valve indicated generally by the numeral 84, this valve having a tubular stem 86 as shown in Figure 9, which tubular stem concentrically and slidingly embraces the valve stem 74 previously mentioned.

Referring now to Figure 3 it will be seen that the tubular valve stem 86 is slidingly disposed in a guide boss 88 extending upwardly above the cylinder head 12 whereby the concentric valve members 74 and 86 are journaled for vertical, guided sliding movement as set forth hereinafter.

The common valve member 84 is further provided with a lower conical surface 90 which constitutes the seating surface of the valve. This surface is adapted to seat upon and having seating engagement with a pair of conical exhaust valve seats 92, these seats being clearly shown in Figure 5, while the seating engagement of the intake valve therewith is illustrated in Figure 4.

The common valve member 84 has a hollow interior, being provided upon its lower portion with an axially disposed opening or passageway 94 which is of the same size as the passageway 62 previously mentioned and in the lowermost position of the intake valve member is adapted to register therewith and form a continuation thereof as shown in Figure 4. The hollow valve member 84 is braced by internal ribs or webs 97 which may connect the top and bottom portions of the hollow valve head, and may be disposed radially thereof as shown.

While the lower conical surface 90 is imperforate, as shown, the upper conical surface 80 is provided with a plurality of apertures 96 which are disposed downwardly upon this upper surface 80 from the engagement of the latter with the intake seat 78.

By a comparison of Figures 3–5, it will be seen that when the common valve member is in its upward position, as shown in Figures 3 and 4, the upper portion of the valve head closes the intake valve seat 78, thus preventing the passage of fluid from the intake passage 14 through the apertures 76 and from thence through the openings 96 into the interior of the hollow head of the valve member 84. At the same time, the lower conical surface 90 of the common valve member 84 is raised from its seating engagement with the exhaust valve seats 92 thereby opening communication between the passages 16, and 56 with the upper conical chamber of the valve seating member 52. When, however, the common valve member 84 is in its lowermost position as shown in Figure 4, the intake port 76 is now open while the exhaust valve seating surface 90 of the valve member 84 is in seating engagement with the exhaust valve seats 92 thereby closing the exhaust valve passages 16 and 56 from the interior of the combustion chamber of the engine and of the upper conical chamber within the valve seating member 52. It will be noted that in this position of Figure 4 just described, the intake passage 14 is in free communication with the combustion chamber of the cylinder, since the valve member 72 is open, and the intake may flow as indicated by the arrows in Figure 4 from the passage 76, through the openings 96, into the interior of the valve member 84 and from the passages 94 and 62 into the combustion chamber.

At this point it should be observed that appropriately placed upon the stem 74 of the valve 72 is an annular collar or shoulder 98 which is adapted to abut and engage the top wall 100 of the hollow chamber within the valve member 84. By this arrangement, downward movement of the tubular valve stem 86 as set forth hereinafter from the closed position shown in Figure 3 will apply pressure to the collar 98 and thus move the valve 72 to its open position shown in Figure 4. This downward movement will close off the exhaust ports and passages, will open the intake ports and passages, and establish communication with the interior of the combustion chamber by opening the valve 72.

However, when the common valve member 84 is in its raised position closing the intake ports and passages, the exhaust valve stem 74 will be independently depressed leaving the common valve member in its raised position, and thereby permitting by opening of the main valve 72 from the seat 70 thereof, free flow of the exhaust products as shown by the arrows in Figure 5 through the passage 62, and into the passages 56 and 16.

It will be observed that during the opening of the main valve and during the exhaust portion of the engine's cycle of operation, that free flow of the exhaust products is permitted; and that the heat given by the exhaust gases to the valve head 84 is largely absorbed by the lower conical portion thereof and by the internal webs 97.

However, when the exhaust ports are closed and the intake ports open, it will be seen that the incoming intake charge will be heated by contact with the interior of the valve head and the radial webs 97, thereby preheating the charge, cooling the valve assembly 84 and maintaining the same within safe operating temperature limits.

In addition, the incoming charge will likewise cool the valve seating member 52 in the region of the exhaust valve seats and the exhaust valve ports.

As shown best in Figure 3, a pair of concentric compression springs 102 and 104 have their lower ends seated upon the top of the cylinder head 12 and have their upper ends respectively engaged and seated upon valve spring seats 106 and 108 respectively secured to the valve stems 74 and 86.

From Figure 3 is will be apparent that the tubular valve stem 86 is provided with a pair of diametrically disposed longitudinally extending slots 110 and a retainer key 112 for the valve spring retainer 106 extends through these slots and is slidable longitudinally therein. This key 112 is abutted by the retainer 106 and extends through a diametrical passage 114 formed in the valve stem 74. Thus, the force of the valve spring 102 is applied to the retainer 106, then to the key 112 and from the latter to the valve stem 74. The slots 110 permit relative movement of the two valve stems with respect to each other while at all times applying the force of the valve spring 102 to the stem 74.

The valve spring retainer 108 is retained by the conventional ring and groove key assembly 116 associated with the retainer and with the tubular stem 86.

Referring now to Figure 2 it will be apparent that each cylinder and valve assembly of the internal combustion engine is provided with a pair of rocker arms, these being the combined intake and exhaust rocker arms previously mentioned and a main valve rocker arm disposed in side by side relation with the intake and exhaust rocker arm and indicated by the numeral 118. The main valve rocker arm has a valve actuating arm 120 which abuts and engages the upper end of the valve stem 74 as will be apparent from a comparison of Figures 2 and 3. The intake and exhaust rocker arm 30 has an arm portion 122 which at its outer end is bent back upon itself to provide the loop 124. This loop embraces the end of the main valve rocker arm 120 as shown in Figure 2, and is disposed somewhat therebelow in the closed position of the valve as shown in Figure 1. The arm 122 with the loop 124 loosely surrounds the upper end of the stem 74 which is contacted by the main valve rocker arm 120, and abuts against a screw threaded collar 126 secured to the upper end of the tubular stem 86 and retained thereon as by fastening pin 128.

It will thus be evident that when the two push rods engaging the main valve and intake and exhaust valve rockers 30 and 118 are operated by the engine cam shaft, not shown, the valve mechanism will be operated in properly timed relation. Since this operation has been set forth hereinbefore, a further explanation is believed to be unnecessary and it is thought that the operation, the construction and advantages of my concentric valve mechanism and valve assembly will now be readily understood and further explanation is believed to be unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be restorted to, falling within the scope of the appended claims.

Having described the invention, what is claimed as new is:

1. In an internal combustion engine having a combustion chamber and an auxiliary chamber in communication therewith, a valve assembly comprising an intake valve seat in the uppermost side of the auxiliary chamber and which is remote from the combustion chamber and an exhaust valve seat in the lowermost side of the auxiliary chamber and which is adjacent the combustion chamber, a combined intake and exhaust valve in said chamber having vertically spaced oppositely disposed upper and lower intake and exhaust valve surfaces respectively engageable with said intake and exhaust valve seats, a main valve controlling the communication between said chambers, means for operating said valves.

2. In an internal combustion engine having a combustion chamber and an auxiliary chamber in communication therewith, a valve assembly comprising an intake valve seat in the uppermost side of the auxiliary chamber and which is remote from the combustion chamber and an exhaust valve seat in the lowermost side of the auxiliary chamber and which is adjacent the combustion chamber, a combined intake and exhaust valve in said chamber having vertically spaced oppositely disposed upper and lower intake and exhaust valve surfaces respectively engageable with said intake and exhaust valve seats, a main valve controlling the communication between said chambers, means for operating said valve, said combined valve having a passage therethrough opening upon the intake valve surface thereof.

3. In an internal combustion engine having a combustion chamber and an auxiliary chamber in communication therewith, a valve assembly comprising an intake valve seat in the side of the auxiliary chamber which is remote from the combustion chamber and an exhaust valve seat in the side of the auxiliary chamber which is adjacent the combustion chamber, a combined intake and exhaust valve in said chamber having oppositely disposed intake and exhaust valve surfaces respectively engageable with said intake and exhaust valve seats, a main valve controlling the communication between said chambers, means for operating said valve, said combined valve having a passage therethrough opening upon the intake valve surface thereof, reenforcing webs in said passage.

4. In an internal combustion engine having a combustion chamber and an auxiliary chamber in communication therewith, a valve assembly comprising an intake valve seat in the side of the auxiliary chamber which is remote from the combustion chamber and an exhaust valve seat in the side of the auxiliary chamber which is adjacent the combustion chamber, a combined intake and exhaust valve in said chamber having oppositely disposed intake and exhaust valve surfaces respectively engageable with said intake and exhaust valve seats, a main valve controlling the communication between said chambers, means for operating said valve, said combined valve having a passage therethrough opening upon the intake valve surface thereof, stems for said main valve and said combined valve, said stems being concentric.

5. The combination of claim 4 including valve springs surrounding said stems, means for connecting a spring to each valve stem for independent movement of the valve stem.

6. An internal combustion engine having a combustion chamber in a cylinder thereof, a valve assembly body in the engine cylinder head, the cylinder head and the body defining an auxiliary chamber therebetween, said body having a passage connecting said chambers, a main valve controlling said passage, said cylinder head and said body having opposed conical surfaces, intake and exhaust seats in said surfaces, a combined intake and exhaust valve having a valve member disposed in said auxiliary chamber between said surfaces, said valve member having valve portions on opposite sides thereof, each portion cooperating with one of said seats, passage means extending through the valve member and opening upon the valve portion which cooperates with the intake valve seat, said passage means connecting at all times with the body passage.

7. Valve operating mechanism for a pair of concentric valve stems, the inner stem having a transverse key extending therethrough, the outer stem having a longitudinal slot therein receiving said key, a rocker shaft, a pair of rockers journaled in side by side relation upon said rocker shaft, means for separately actuating said rockers, said rockers each having a valve stem actuating end engaging one of said valve stems, the actuating end of one rocker having a loop encircling the end of the other rocker, said loop operatively engaging one of said valve stems and the actuating end of the other rocker being movable within said loop and engaging the end of the other valve stem.

8. The combination of claim 1 wherein said means comprises means for independently operating said main valve and means for simultaneously operating said combined valve and said main valve.

9. The combination of claim 8 wherein said last means includes a rocker shaft mounted on said engine, a rocker arm journaled thereon, a guide bushing on one end of said rocker arm, the other end of said arm being engageable with said combined valve, a pin slidably mounted in said bushing, a push rod operatively connected to said pin, said pin having limited axial movement in said bushing, means to adjustably limit said movement, a spring surrounding said pin and connected thereto for urging said pin towards said push rod.

10. In combination with an internal combustion engine having a combustion chamber and a cylinder head provided with intake and exhaust passages, a member secured to said cylinder head and having passages each communicating with one of said intake and exhaust passages, said member being recessed to present an auxiliary chamber, a single valve member having a portion disposed within said recess and provided with vertically spaced upper and lower valve seating portions and movable between a position disestablishing communication between the intake passage and the chamber and a position disestablishing communication between the exhaust passage and said chamber, said member having an opening communicating with the combustion chamber of the internal combustion engine, valve means for controlling communication between said chamber and said combustion chamber, and means for operating said valve member and said valve means.

11. The combination of claim 10 wherein that portion of the valve member disposed within the said recess is provided with angularly disposed surfaces presenting opposed valve faces for effecting the disestablishing of communication to said intake and exhaust passages respectively.

12. The combination of claim 11 wherein the said valve member portion is in the form of an enlarged body, passage means in said body connecting at all times with said chamber, said passage means also connecting with said intake passage when communication between said exhaust passage and said valve member chamber is disestablished.

13. In combination with an internal combustion engine having a cylinder head provided with intake and exhaust passages, a member secured to said cylinder head and communicating with both said intake and exhaust passages, said member being recessed to present a chamber, a single valve member having a portion disposed within said recess and movable between a position disestablishing communication between the intake passage and the chamber and a position disestablishing communication between the exhaust passage and said chamber, said member having an opening communicating with the combustion chamber of the internal combustion engine, valve means for controlling communication between said chamber and said combustion chamber, and means for operating said valve member and said valve means, said valve member and said valve means including concentric stems, the inner stem having a transverse key extending therethrough, the outer stem having a longitudinal slot therein receiving said key, a rocker shaft, a pair of rockers journaled in side by side relation upon said rocker shaft, means for separately actuating said rockers, said rockers each having a valve stem actuating and engaging one of said valve stems, the actuating end of one rocker having a loop encircling the end of the other rocker, said loop operatively engaging one of said valve stems and the actuating end of the other rocker being movable within said loop and engaging the end of the other valve stem.

14. The combination of claim 13 wherein one of said rockers is provided with a guide bushing on its end opposite the associated valve stem, a pin slidably mounted in said bushing, a push rod operatively connected to said pin, said pin having limited axial movement in said bushing, means to adjustably limit said movement, and a spring surrounding said pin and connected thereto for urging said pin towards said push rod.

References Cited in the file of this patent

UNITED STATES PATENTS

| | | |
|---|---|---|
| 860,608 | Schwehm | July 16, 1907 |
| 862,100 | Osborn | July 30, 1907 |
| 878,364 | Edwards | Feb. 4, 1908 |
| 912,150 | McCollum | Feb. 9, 1909 |
| 979,024 | Moore | Dec. 20, 1910 |
| 1,054,970 | Leighty | Mar. 4, 1913 |
| 1,309,339 | Reynolds | July 8, 1919 |
| 1,525,583 | Koehler | Aug. 22, 1921 |
| 1,663,035 | Asbury | Mar. 20, 1928 |
| 2,354,988 | Fix | Aug. 1, 1944 |
| 2,525,791 | Good | Oct. 17, 1950 |
| 2,658,488 | Taub | Nov. 10, 1953 |

FOREIGN PATENTS

| | | |
|---|---|---|
| 347,599 | Italy | Apr. 13, 1937 |